United States Patent [19]

Hiratsuka et al.

[11] Patent Number: 4,702,977
[45] Date of Patent: Oct. 27, 1987

[54] SECONDARY BATTERY USING NON-AQUEOUS SOLVENT

[75] Inventors: Kazuya Hiratsuka, Yokohama; Yuichi Sato, Atsugi; Yoshiyasu Aoki, Tokyo; Hiroshi Yui, Yokkaichi; Mitsutaka Miyabayashi, Yokkaichi; Akira Itsubo, Yokkaichi, all of Japan

[73] Assignees: Toshiba Battery Co., Ltd.; Mitsubishi Petrochemical Co., Ltd., both of Tokyo, Japan

[21] Appl. No.: 855,826

[22] Filed: Apr. 24, 1986

[30] Foreign Application Priority Data

Apr. 30, 1985 [JP] Japan .................................. 60-92437
Apr. 30, 1985 [JP] Japan .................................. 60-92438

[51] Int. Cl.$^4$ ..................... H01M 4/38; H01M 10/40
[52] U.S. Cl. ..................... 429/194; 429/218
[58] Field of Search .................. 429/194, 218, 232

[56] References Cited

U.S. PATENT DOCUMENTS 4,615,959 10/1986 Hayashi et al. .................... 429/194
4,615,960 10/1986 Yata .................................. 429/194
4,617,243 10/1986 Nogami et al. .................... 429/194

Primary Examiner—Donald L. Walton
Attorney, Agent, or Firm—Frishauf, Holtz, Goodman & Woodward

[57] ABSTRACT

There is disclosed a secondary battery using a non-aqueous solvent which comprises using a carbonaceous material obtained by carbonating an organic compound and having a pseudographite structure of a hydrogen/carbon ratio being 0.15 or less, a $d_{002}$ being 3.37 Å or more and a Lc being 150 Å or less as a negative electrode.

The battery has a large electric density, less in self-discharging and excellent in preservability.

20 Claims, 4 Drawing Figures

SECONDARY BATTERY USING NON-AQUEOUS SOLVENT

BACKGROUND OF THE INVENTION

The present invention relates to a secondary battery using a non-aqueous solvent, more particularly to a secondary battery using a non-aqueous solvent which is less in self-discharge, has good charge/discharge cycle characteristics and is excellent in storability.

In recent years, as a secondary battery which is compact and lightweight and has high energy density, those which is used a kind of a conductive polymer as a negative electrode material and the negative electrode is combined with an electrolyte dissolved an alkali metal ion such as lithium ion, sodium ion and the like have been attracted attention. This kind of secondary battery is doping/undoping or intercalating/deintercalating the aforesaid metal ion electrochemically to the negative electrode and this doping/undoping phenomenon, etc. are utilized as a charge/discharge step. Thus, it has an advantage that, as caused in the secondary battery which is employed a conventional alkaline metal itself as the negative electrode, internal short due to precipitation of the alkaline metal dendritely during the discharge or remarkable deterioration of charge/discharge efficiency can be eliminated.

As this kind of secondary battery, there has been known one, for example, in which a negative electrode comprising a polyacetylene and a lithium ion are combined as disclosed in Japanese Provisional Patent Publication No. 136469/1981. Further, as a conductive polymer which is usable for a negative electrode material, there may be mentioned, in addition to the above polyacetylene, a linear high molecular compound having a conjugated double bond such as a poly(p-phenylene), a polypyrrol, a polythienylene, a polyaniline, a poly(p-phenylenesulfide), a poly(p-phenyleneoxide) and the like.

Since these conductive polymer is lightweight and a potential for doping/undoping an alkali metal ion such as lithium ion, etc. to said polymer is substantially similar as a charge/discharge potential in case that the alkali metal is employed as a negative electrode, it has an advantage that an energy density per unit weight is high when it has used in a secondary battery. However, the aforesaid conductive polymer is unstable at a state of doping the alkali metal ion, that is, a charged state, and since it reacts with a solvent or decomposes itself, there are problems that a self-discharge becomes remarkably great as well as a cycle characteristic will be deteriorated.

On the other hand, there has been reported a secondary battery in which a graphite having a structure of spreading conjugated double bonds quadratically is used as a carbonaceous material and a graphite interlayer compound which is intercalated by electrochemically reducing an alkali metal ion is employed as a negative electrode active substance. However, in such a secondary battery, since an alkali metal-graphite interlayer compound formed by charging is chemically unstable and it reacts with solvent in accordance with destruction of a graphite structure, there are disadvantages that its storability is bad and deterioration of charge/discharge efficiency as well as lowering of cycle characteristics will be occurred.

Further, there has been reported a secondary battery in which, as the carbonaceous material for constituting a negative electrode, those obtained by carbonizing an organic high molecular compound such as a phenol resin, a polyacrylonitrile, a cellulose and the like have been used. For example, in Japanese Provisional Patent Publication No. 209864/1983, a secondary battery using as a negative electrode a carbonaceous material obtained by heat treating an aromatic condensed polymer, which has an atomic ratio of hydrogen/carbon being in the range of 0.15 to 0.33 has been disclosed.

Such a secondary battery has high output power as compared with a secondary battery using the conventional conductive polymer or a graphite as a negative electrode. However, it is the actual circumstances that there is not yet improved at all in the point that the negative electrode reacts with an electrolytic solvent irreversibly during charged state so that an increase of self-discharge and a deterioration of cycle characteristics will be caused.

As stated above, there remains a problem that a negative electrode material which utilizes a dope/undope or an intercalate/deintercalate phenomenon of an alkali metal ion is used in a battery, in all cases, a self-discharge increases and a cycle lifetime is short.

SUMMARY OF THE INVENTION

An object of the present invention is to cancel such conventional problems and to provide a secondary battery using a non-aqueous solvent which is less in self-discharge, good in charge/discharge cycle characteristics and excellent in storability.

The present inventors have carried out earnest investigations in order to establish the above object by focusing the development of a negative electrode material for the secondary battery using a non-aqueous solvent. As results, they have found that by constituting a negative electrode with a carbonaceous material which satisfies various conditions mentioned below simultaneously, a secondary battery using a non-aqueous solvent having excellent characteristics can be obtained and accomplished the present invention.

That is, the secondary battery using a non-aqueous solvent of the present invention comprises in a secondary battery using a non-aqueous solvent comprising a positive electrode capable of recharging, an electrolytic solution dissolving an electrolyte in a non-aqueous solvent and a negative electrode capable of recharging, the improvement wherein said negative electrode comprises a carbonaceous material obtained by the carbonization of at least one of a compound selected from the group consisting of an organic high molecular compound, a condensed polycyclic hydrocarbon compound and polycyclic heterocyclic compound, and having a pseudographite structure of an atomic ratio of hydrogen/carbon being not more than 0.15, the spacing of (002) planes as determined by X-ray wide-angle diffraction being 3.37 Å or more and the crystallite size in the direction of c axis being 150 Å or less.

DESCRIPTION OF THE PREFERRED EMBODIMENTS

Figure 1:
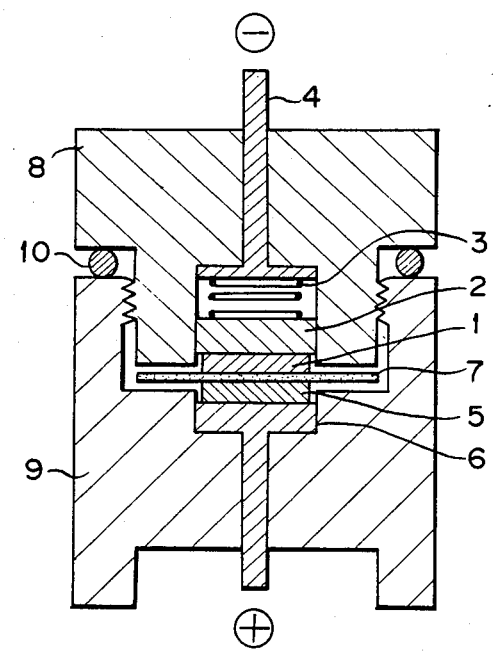
FIG. 1 is a longitudinal sectional view showing one example of the non-aqueous solvent secondary battery of the present invention.

In the secondary battery using a non-aqueous solvent of the present invention, as a starting material for obtaining a carbonaceous material which constitutes a negative electrode, it can be used at least one compound selected from the group consisting of an organic high molecular compound, a condensed polycyclic hydrocarbon compound and polycyclic heterocyclic compound.

As the organic high molecular compound, there may be employed any of organic high molecular compound of, for example, a linear novolac resin; a cellulose resin; a phenol resin; an acrylic resin such as a polyacrylonitrile, a poly($\alpha$-halogenacrylonitrile), etc.; a halogenated vinyl resin such as a polyvinyl chloride, a polyvinylidene chloride, a polychlorinated vinyl chloride, etc.; a polyamideimide resin; a polyamide resin; a conjugated resin such as a polyacetylene, a poly(p-phenylene), etc. Of these compounds, the linear novolac resin is particularly preferred.

Condensed polycyclic hydrocarbon compounds are such that at least two monocyclic hydrocarbon compounds consisting of a three- or more membered ring are condensed together or derivatives of such condensed products. Specific examples of the condensed polycyclic hydrocarbon compounds may be mentioned, for example, naphthalene, phenanthrene, anthracene, triphenylene, pyrene, chresene, naphthacene, picene, perylene, pentaphene, pentacene and the like, and the derivatives thereof may include carboxylic acid, carbocylic acid anhydride or carboxylic acid amide of the above compounds. Further, various kinds of pitches mainly comprising mixtures of the above respective compounds.

Polycyclic heterocyclic compounds are such that at least two monocyclic heterocyclic compounds consisting of a three- or more membered ring are condensed together or at least one such monocyclic heterocyclic compound is condensed with at least one monocyclic hydrocarbon compound consisting of a three- or more membered ring and derivatives of such condensed products. Specific examples of the polycyclic heterocyclic compounds may be mentioned, for example, indole, isoindole, quinoline, isoquinoline, quinoxaline, phthalazine, carbazole, acridine, phenazine, phenanthridine and the like, and the derivatives thereof may include carboxylic acid, carbocylic acid anhydride or carboxylic acid amide of the above compounds. Further, 1,2,4,5-tetracarboxylic acid of benzene, its dianhydride or its diimide may also be used.

The carbonaceous materials of the present invention are those obtained by carbonizing the above mentioned respective compound and have a pseudographite structure satisfying the following conditions simultaneously.

That is, in the first place, an atomic ratio of hydrogen/carbon measured by an elemental analysis is not more than 0.15, preferably not more than 0.10, more preferably not more than 0.07.

In the second place, a spacing ($d_{002}$) of (002) plane measured by X-ray wide angle diffraction is 3.37 Å or more, preferably 3.39 Å to 3.75 Å, more preferably 3.41 Å to 3.70 Å.

In the third place, a crystallite size in the direction of c axis, Lc, measured by the same X-ray wide angle diffraction is 150 Å or less, preferably 8 Å to 100 Å, more preferably 10 Å to 70 Å.

While the carbonaceous material of the present invention can be obtained by carbonizing the above-mentioned respective compounds, the procedures of the carbonization are considered as described below in the case of the condensed polycyclic hydrocarbon compound as the starting material. That is, when a thermal energy greater than the dissociation energy necessary to break the bond between the skeletal carbon and an adjacent hydrogen atom or a substituent is provided by heating, carbon radicals are formed predominantly by homolytic cleavage. A chain of carbon radicals is cyclized to provide a higher molecular weight and the polycyclic aromatic planes are developed so that the process of carbonization successively occurs. In the initial stage of carbonization, for example, benzene rings are bound together one-dimensionally to form a one-dimensional graphite structure. Subsequently, the benzene rings start to bind with one another two-dimensionally, and gradually expanding polycyclic aromatic planes begin to stack in layers to form a two-dimensional graphite structure.

With further progress of carbonization, more benzene rings are bound two-dimensionally and adequately expanded polycyclic aromatic planes stack one on another in an orderly manner to form the ordinary graphite. In accordance with the present invention, all structures that lead to the final graphite are collectively referred to as the pseudographite structure.

The pseudographite structure in accordance with the present invention can be determined quantitatively by using an X-ray wide angle diffraction. The ordinary graphite shows a sharp diffraction peak corresponding to a (002) plane at about $2\theta = 26°$.

A one-dimensional graphite formed in the initial stage of carbonization of the present invention shows no diffraction peak corresponding to the (002) plane or shows a very broad and its intensity is low.

Then, the polycyclic aromatic planes is developed two-dimensionally to some extent and begin to stack one after another, the diffraction peak corresponding to the (002) plane gradually becomes sharp and its intensity increases.

The pseudographite structure which characterizes the carbonaceous material of the present invention is such that the spacing of (002) planes, $d_{002}$, is at least 3.37 Å and the crystallite size in the direction of c axis, Lc, is not more than 150 Å. Preferably, $d_{002}$ is at least 3.40 Å and not more than 3.75 Å, whereas Lc is at least 7.0 Å and not more than 150 Å. The case where no diffraction peak corresponding to the (002) plane is observed at all is also included in the present invention.

When the carbonaceous material to be used is not satisfied any one of the above three inevitable requirements, that is, the atomic ratio of hydrogen/carbon is 0.15 or more, the spacing $d_{002}$ of the (002) plane measured by the X-ray wide angle diffraction is not more than 3.37 Å or the crystallite size in the direction of c axis, Lc, measured by the same exceeds 150 Å, in the secondary battery using the carbonaceous material as the negative electrode, disadvantages that over voltage of charge/discharge at the negative electrode side becomes large, a gas is generated from the electrode at the charging, storability of the battery at the charged state is bad and charge/discharge cycle characteristics are deteriorated are caused.

In the carbonaceous material to be used in the present invention, the following conditions may desirably be satisfied in addition to the above three conditions. That is, in the pseudographite structure determined quantitatively by using the X-ray wide angle diffraction, a crystallite size in the direction of a axis La is preferably 10 Å or more, more preferably 15 Å or more and 150 Å or less, particularly preferably 19 Å or more and 70 Å or less. Further, a distance $a_0(=2d_{110})$ twice the spacing $d_{110}$ of the (110) planes measured by the X-ray wide angle diffraction is preferably 2.38 Å or more and 2.47 Å or less, more preferably 2.39 Å or more and 2.46 Å or less. Moreover, at least one of the signals have an inter-peak line width ($\Delta Hpp$) obtained by first differential absorption curve of the electron spin resonance spectrum (measured at 23° C.) of preferably 20 gauss or more, or no signals have an inter-peak line width ($\Delta Hpp$) of not more than 20 gauss. More preferably, at least one of the signals have an inter-peak line width ($\Delta Hpp$) obtained by first differential absorption curve of the electron spin resonance spectrum (measured at 23° C.) of preferably 50 gauss or more, or no signals have an inter-peak line width ($\Delta Hpp$) of not more than 50 gauss.

The above carbonaceous material is specified by the atomic ratio of hydrogen/carbon obtained by the elemental analysis, but a small proportion of other atoms such as a nitrogen, oxygen, halogen may be present.

In the present invention, the carbonaceous material constituting the negative electrode can be obtained by carbonating the aforesaid compounds, more specifically by sintering under vacuum or through an inert gas ($N_2$, Ar, etc.). Since the carbonating temperature is closely related to the above atomic ratio of hydrogen/carbon, it is required to set the atomic ratio to not more than 0.15. The carbonating temperature is different depending on the kinds of the compounds to be used as a starting material but usually 500° to 3,000° C. is preferred.

Of the aforesaid compounds, with respect to polyacrylonitrile, pitch, etc., it is preferred to carry out, prior to carbonization, the flame resistant treatment or the infusible treatment at 200° to 400° C. by heating under active atmosphere such as an air.

Further, after completion of the carbonization step, the obtained carbonaceous material may be activated by heating the carbonaceous material under oxidative gaseous atmosphere such as vapor, carbon dioxide, etc. whereby a specific surface area thereof can be increased.

The positive electrode material of the non-aqueous solvent secondary battery in accordance with the present invention is not particularly limited and there may be mentioned, for example, a metallic chalcogen compound which release or capture an alkali metal cation such as lithium ion, etc. accompanying charge/discharge reaction, and a carbonaceous material having specific hydrogen/carbon atomic ratio as mentioned in the above negative electrode.

First, specific examples of the metallic chalcogen compounds to be used as the constituting material of the positive electrode of the present invention may include oxides such as $Cr_3O_8$, $V_2O_5$, $V_6O_{13}$, $LiCoO_2$, $MoO_3$, $WO_3$, etc.; sulfides such as $TiS_2$, $V_2S_5$, $MoS_2$, $MoS_3$, CuS, $Fe_{0.25}V_{0.75}S_2$, $Cr_{0.25}V_{0.75}S_2$, $Cr_{0.5}V_{0.5}S_2$, $Na_{0.1}CrS_2$, etc.; phosphine.sulfur compounds such as $NiPS_3$, $FePS_3$, etc.; and selenium compounds such as $VSe_2$, $NbSe_3$, etc., among them, $TiS_2$, $MoS_2$ and $V_2O_5$ are particularly preferred.

To use such metallic chalcogen compounds as the positive electrode is preferred in the point of obtaining a secondary battery having large capacity and high reliability.

On the other hand, a carbonaceous material to be used as the constituting material of the positive electrode is the same as the carbonaceous material constituting the above negative electrode and one obtained by carbonization of at least one compounds selected from the group consisting of an organic high molecular compound, a condensed polycyclic hydrocarbon compound and a polycyclic heterocyclic compound, and has an atomic ratio of hydrogen/carbon being 0.10 or more and 0.70 or less, preferably 0.10 or more and 0.60 or less, more preferably 0.10 or more and 0.50 or less. When the atomic ratio of hydrogen/carbon deviates the above range, over voltage of the charge/discharge at the positive electrode side becomes large and stable charge/discharge cyclic could not be realized with low charge efficiency of the charge/discharge whereby deterioration of the battery characteristics may be caused according to circumstances.

When these carbonaceous material is used as the positive electrode material, it is preferred that the atomic ratio of hydrogen/carbon of the carbonaceous material constituting the positive electrode is set greater than those of the carbonaceous material constituting the negative electrode from the point of heightening the battery characteristics much more.

Moreover, these carbonaceous materials are preferred those having pseudographite structure satisfying the conditions as mentioned below. That is, the carbonaceous material to be used in the positive electrode is firstly the spacing of (002) planes, $d_{002}$, measured by the X-ray wide angle diffraction is preferably at least 3.42 Å, more preferably at least 3.44 Å, particularly preferably at least 3.46 Å. Further, the crystallite size in the direction of c axis, Lc, is not more than 70 Å, more preferably not more than 50 Å, particularly preferably not more than 30 Å, and the crystallite size in the direction of axis, La, is not more than 70 Å, more preferably not more than 50 Å, particularly preferably not more than 30 Å. Moreover, a distance $a_0(=2d_{110})$ twice the spacing $d_{110}$ of the (110) planes measured by the X-ray wide angle diffraction is preferably not more than 2.45 Å, more preferably 2.37 Å or more and 2.43 Å or less.

Furthermore, the carbonaceous materials to be used in the positive electrode have preferably at least one of the signals having an inter-peakline width ($\Delta Hpp$) obtained by first differential absorption curve of the electron spin resonance spectrum (measured at 23° C.) of 7 gauss or more, or no signals having an inter-peak line width ($\Delta Hpp$) of not more than 7 gauss. More preferably, they have at least one of the signals having an inter-peak line width ($\Delta Hpp$) obtained by first differential absorption curve of the electron spin resonance spectrum (measured at 23° C.) of preferably 10 gauss or more, or no signals having an inter-peak line width ($\Delta Hpp$) of not more than 10 gauss.

Also, the carbonaceous material constituting the positive electrode can be obtained in the same manner as in the carbonaceous materials for the negative electrode by carbonating the aforesaid compounds, that is by by sintering them. The carbonating temperature at this time may preferably be set, for example, at 300° to 2,000° C.

When the positive electrode comprising these carbonaceous material and the negative electrode comprising the aforesaid materials for the negative electrode are combinedly used, a secondary battery having good battery performances can be obtained without carrying out the preliminary operation of discharging or charging the positive electrode or the negative electrode previously.

In the present invention, as the materials for the positive electrode, in addition to the above metallic chalcogen compounds and the carbonaceous materials, a conductive polymer doped or dedoped an electrolytic anion accompanying with the charge/discharge reaction can also be used. As the conductive polymer, there may be mentioned high molecular compounds having linear conjugated double bonds such as polyacetylene, poly(p-phenylene), polypyrrole, polythienylene, polyaniline, poly(p-phenylenesulfide), poly(p-phenyleneoxide) and the like.

Further, in the non-aqueous secondary battery of the present invention, as the electrolyte, those dissolved an electrolytic salt in a non-aqueous solvent can be used. As the non-aqueous solvent, there may be used propylene carbonate, ethylene carbonate, dimethoxyethane, $\gamma$-butyrolactone, tetrahydrofuran, 2-methyltetrahydrofuran, sulforane, 1,3-dioxorane and the like, and they may be used alone or in combination of 2 or more. On the other hand, as the electrolytic salts, those obtained by optionally combining an anion such as $ClO_4^-$, $PF_6^-$, $BF_4^-$, $CF_2SO_3^-$, $AsF_6^-$, etc. and an alkali metal cation such as $Li^+$, $Na^+$, $K^+$, etc. can be used. As the cation, in addition to the above alkali metal cation, cation species of quaternary amines such as $N(CH_3)_4^+$, $N(C_2H_5)_4^+$, $N(n-C_3H_7)_4^+$, etc. may be used.

When the metallic chalcogen compound is used as the active substance in the positive electrode and carbonaceous materials as the negative electrode of the secondary battery, either one of the positive electrode and the negative electrode or both of the positive and negative electrodes may preferably be doped an alkali metal cation such as $Li^+$ and the like.

In case where doping is previously carried out with respect to the positive electrode, a battery in the discharged state can be realized, while doping in the negative electrode provides a battery in the charged state. When the doping is carried out in both of the positive and negative electrodes, a battery in any state between discharged and charged by changing the ratio of doping amounts to the respective electrodes can be manufactured.

The capacity of the battery is determined by the total amounts of an alkali metal to be doped in the positive and/or negative electrodes.

When the carbonaceous material of the present invention is used in the negative electrode, the alkali metal is doped in a film-like or a strip-like carbonaceous material or is doped in moldings prepared by mixing a powder of the carbonaceous material and a powder state adhesive such as polytetrafluoroethylene, polyethylene, etc. and kneading, and then by molding under heating.

As the method for doping the alkali metal cation in the electrodes previously, there may be mentioned, for example, the electrochemical method, the chemical method and the physical method.

More specifically, as the electrochemical method, there may include a method in which the carbonaceous material of the present invention is used as the positive electrode, an alkali metal M is used as the negative electrode and an electrolyte obtained by dissolving an alkali metal salt such as $MClO_4$, $MPF_6$, $MBF_4$, $MAsF_6$, $MAlCl_4$, $MCl$, $MBr$, $MI$ and the like (where M is anyone of Li, Na, K, Rb and Cs) in an organic solvent such as propylene carbonate, 1,2-dimethoxyehtane, $\gamma$-butyrolactone, dioxolan, ethylene carbonate, 2-methyl-tetrahydrofuran and the like is interposed between the electrodes to continue therebetween or a current is passed therethrough. As the chemical method, there may be mentioned the method in which the carbonaceous material according to the present invention is dipped in an organic solvent solution such as ether, aliphatic hydrocarbon, etc., dissolved an alkylated alkali metal therein. Further, as the physical method, there may be mentioned the method in which the carbonaceous material according to the present invention is exposed to vapor of an alkali metal. Of these methods, preferred are the electrochemical method and the chemical method and more preferred is the electrochemical method.

When the alkali metal is doped in the positive electrode, i.e., in the metallic chalcogen compound which is the discharged state of the battery, the same methods as in the above carbonaceous material can also be applied.

In this case, when the metallic chalcogen compound electrode is used as the positive electrode, a negative potential is applied to the electrode and a positive potential is applied to the opposite electrode.

As the opposite electrode material, there may be mentioned, for example, an inert metal such as platinum, etc., and an alkali metal such as lithium, etc., but the use of lithium is particularly desired.

When the non-aqueous solvent secondary battery is constituted by the above material, the positive electrode and the negative electrode are laminated opposite to each other lying a separator between them and/or interposed a separator between them and a non-aqueous solvent containing an electrolyte. Each electrode has a plate-like structure in general, but the structure where one electrode is made a cylindrical shape and the other electrode is inserted therein may be employed. Further, the structure where the positive electrode and the negative electrode are made opposite to each other through a separator and spirally wound to form a spiral structure may also be employed.

Further, it is a desirable embodiment that the electrolytic solution is impregnated in a separator such as a non woven, a woven, an open cell cellular foaming material and a porous plastic sheet and the separator is interposed between both of the electrodes.

In the non-aqueous secondary battery constituted by the negative electrode, the positive electrode and the electrolyte comprising the aforesaid each materials, it is confirmed that an electrochemically oxidation/reduction reaction in accordance with the dope/undope of the alkali metal ion is occurred at the charge/discharge and the battery has been less self-discharge and has good cycle characteristics.

In the secondary battery using a non-aqueous solvent of the present invention, a discharging capacity of the positive eletrode should preferably be set 1.1-fold or more to that of the negative electrode, more preferably 1.1-fold to 3-fold, and most preferably 1.5-fold to 2-fold.

That is, for example, in case of using $V_2O_5$ as the positive electrode active substance, by repeating dope-/undope of lithium to the $V_2O_5$, reversibility of dope-/undope of lithium to the $V_2O_5$ will be gradually impaired when the doping is carried out in an amount of $\frac{2}{3}$ or more to the maximum amount capable of being doped the lithium to the $V_2O_5$ so that deterioration of the battery capacity accompanied by proceeding of cycles will be remarkable.

By the reason as stated above, when the battery constitution using the metallic chalcogen compound as the positive electrode and the carbonaceous material in accordance with the present invention as the negative electrode is employed, it is preferred that the capacity of the positive electrode is set 1.1-fold or more to that of the negative electrode to enlarge a space (residual capacity) capable of accepting a lithium ion at discharging.

When the capacity of the positive electrode is set 1.1-fold or more to that of the negative electrode, the capacity of the battery is regulated by the capacity of the negative electrode. Therefore, it is not preferred to remarkably enlarge the capacity of the positive electrode to that of the negative electrode since high capacity characteristics which are possessed of the battery of the present constitution will be lost, and thus, the discharging capacity of the positive electrode is set within the above range.

In the present invention, each measurements of the elemental analysis, X-ray wide angle diffraction and electron spin resonance spectrum are carried out following the methods as described below.

[Elemental analysis]

A sample is dried in vacuum at 120° C. for about 15 hours. Then, the sample is transferred onto a hot plate in a dry box and dried in vacuum at 100° C. for 1 hour. A portion of the dried sample is put into an aluminum cup in an argon atmosphere, and the carbon content is determined from the weight of $CO_2$ gas evolved as a result of combustion whereas the hydrogen content is determined from the weight of $H_2O$ also evolved by combustion. In the Examples of the present invention that follow, an elemental analyzer of Perkin-Elmer Model 240 C was used.

[X-ray wide angle diffraction]

(1) $d_{002}$, the spacing of (002) planes, and $d_{110}$, the spacing of (110) planes:

A powder of carbonaceous material (flaky carbonaceous material is reduced to a powder in an agate mortar) is packed into a sample cell together with about 15 wt % of the powder of an internal standard substance, a high-purity silicon powder of the standard grade for X-ray analysis. A wide-angle X-ray reflection diffractometer scan is obtained with monochromatic CuKα radiation from a graphite monochrometer. Instead of making corrections associated with the Lorentz factor, polarization factor, absorption factor and atomic scattering factor, the following simple and convenient method is used. Draw a baseline for the scan curves corresponding to diffractions at (002) and (110) Planes. Plot the substantial intensities as calculated from the baseline, obtaining corrected curves for (002) and (110) planes. Draw an angular axis at a height which is two-thirds of the height of the peak in each curve and obtain the midpoint of the line defined by the two points where a line parallel to that angular axis intersects the scan curve. Correct the angle of the midpoint by the internal standard to obtain a value twice the angle of diffraction. Substitute this value and the wavelength of CuKα radiation, λ, into the following two equations of Bragg's law to obtain $d_{002}$ and $d_{110}$:

$$d_{002} = \frac{\lambda}{2 \sin \theta} \; [\text{Å}];$$

$$d_{110} = \frac{\lambda}{2 \sin \theta'} \; [\text{Å}]$$

wherein
λ: 1.5418 Å
$\theta, \theta'$: the angle of diffraction corresponding to $d_{002}$ or $d_{110}$.

(2) Crystallite size in c and a axes, Lc and La:

Obtain the half-width β at a point half the height of the peak in each of the corrected scan curves prepared in (1), and substitute this value into the following equations:

$$Lc = \frac{K \cdot \lambda}{\beta \cdot \cos \theta} \; [\text{Å}];$$

$$La = \frac{K \cdot \lambda}{\beta \cdot \cos \theta'} \; [\text{Å}]$$

Various values may be taken for the shape factor K, but in the present invention, K=0.90 is used. For the meanings of λ, θ and θ', the same as the previous paragraph.

[Line width between peaks in the first differential of the absorption spectrum of electron spin resonance: ΔHpp]

The first differential of the absorption spectrum of electron spin resonance was measured with JEOL JES-FE 1X ESR spectrometer in the X-band. A powder of carbonaceous material (flaky carbonaceous material is reduced to a powder in an agate mortar) is put into a capillary tube (ID: 1 mm) which is placed in an ESR tube (OD: 5 mm). The radiofrequency magnetic field is modulated by an amount of 6.3 gauss. All the procedures above are followed within air at 23° C. The value of the line width between peaks in the first differential of the absorption spectrum (ΔHpp) is determined by comparison to a standard sample $Mn^{2+}/MgO$.

EXAMPLES

Examples 1 to 11

(1) Preparation of the carbonaceous material

In a reactor were put 108 g of ortho-cresol, 32 g of paraformaldehyde and 240 g of ethylcellosolve with 10 g of sulfuric acid, and the mixture was reacted at 115° C. for 4 hours under stirring. After completion of the reaction, the mixture was neutralized by adding 17 g of $NaHCO_3$ and 30 g of water. Then, under stirring with high speed, the reaction mixture was poured into 2 liters of water and precipitated products were collected by filtration to obtain 115 g of linear high molecular weight novolac resin. The number average molecular weight of the resin was measured by applying the vapor pressure method (in methylethyl ketone, at 40° C.) to obtain 2600.

After dissolving 2.25 g of this novolac resin and 0.25 g of hexamine in ethanol, the ethanol was evaporated and removed to obtain a mixture of the novolac resin and hexamine. Then, the mixture was put in a glass vessel under nitrogen gas stream, and heat treated at 250° C. for 2 hours under nitrogen gas stream.

The thus obtained heat-treated mixture was not dissolved in ethanol but swelled. The swelled heat-treated mixture was carried out the press forming at a temperature of 190° C. under a pressure of 200 Kg/cm² to obtain a strip having a width of 2 cm, a length of 5 cm and a thickness of 1 mm.

Then, the press forming product was set in an electric furnace and under nitrogen stream carbonization was carried out by elevating the temperature to 2100° C. per elevating speed of 20° C./min. and maintaining the temperature, i.e., at 2100° C. for one hour under nitrogen stream. As a result, 80 mg of a strip-like carbonaceous material a having black color was obtained.

Further, in the above steps, by the same conditions as in the above except for changing the carbonization temperature to 1600° C., 1400° C., 1000° C. and 800° C., each 80 mg of strip-like carbonaceous materials b, c, d and e was obtained, respectively.

Each value of the carbonization temperature [°C.] during synthesis, the atomic ratio of hydrogen/carbon measured by elemental analysis, the plane spacing $d_{002}$ [Å] of (002) plane and the plane spacing $d_{110}$ [Å] of (110) plane each measured by the X-ray wide angle diffraction, the crystallite size Lc [Å] in the direction of c axis and the crystallite size La [Å] in the direction of a axis, and the line width between peaks of the electron spin resonance spectrum $\Delta Hpp$ [gauss] of the carbonaceous materials a to e was summarized in Table 1. In the table, each of the above values with respect to graphite was also shown.

As clearly seen from the table, among the above carbonaceous materials a to e, a and b are materials for the negative electrode, d and e are materials for the positive electrode, and c is a material usable for both the negative electrode and the positive electrode.

ylene carbonate solution containing 1.5 mole/liter of $LiCO_4$. Further, the positive electrode 5 is compressedly adhered to a collector 6 for the positive electrode comprising titanium which serves as a positive terminal. Between the negative electrode 1 and the positive electrode 5, a separator 7 comprising non woven fabric of propylene carbonate is provided therethrough and they are all compressedly adhered with each other by the spring 3. Reference numerals 8 and 9 are vessels made of Teflon (trade name, produced by du Pont de Nemours), and inner materials are sealed by an O ring 10. Moreover, 2 ml of a propylene carbonate solution containing 1.5 mole/liter of $LiClO_4$ as an electrolyte is filled in the separator 7, and the vessels 8 and 9.

Here, by combinedly using the carbonaceous materials a, b, c, d and e shown in Table 1, and $TiS_2$ and $V_2O_5$ as the above positive electrode 5 and the negative electrode 1, batteries A, B, C, D, E, F, G, H, I, J and K of the present invention were prepared and they were evaluated with respect to the following evaluating tests of respective performances.

Comparative examples 1 to 8

In the same manner as in Examples 1 to 11, by combinedly using the carbonaceous materials d and e shown in Table 1, graphite and $TiS_2$ and $V_2O_5$ as the above positive electrode 5 and the negative electrode 1, batteries L, M, N, O, P, Q, R and S for comparative purpose were prepared and they were also evaluated with respect to the following evaluating tests of respective

TABLE 1

| Carbonaceous material | Carbonization temperature [°C.] | Hydrogen/carbon atomic ratio | $d_{002}$ [Å] | $a_0$ $(2d_{110})$ [Å] | La [Å] | Lc [Å] | $\Delta Hpp$ [gauss] |
|---|---|---|---|---|---|---|---|
| a | 2100 | 0.04 | 3.58 | 2.42 | 23 | 15 | 200 |
| b | 1600 | 0.05 | 3.68 | 2.39 | 19 | 12 | 90 |
| c | 1400 | 0.12 | 3.72 | 2.39 | 17 | 11 | 60 |
| d | 1000 | 0.16 | 3.90 | 2.38 | 14 | 11 | — |
| e | 800 | 0.23 | unclear the diffraction peak | | | | 18 |
| graphite | — | 0.01 | 3.36 | 2.46 | 327 | 308 | 5 |

(2) Evaluating tests of the secondary battery performances

By using each of the carbonaceous materials obtained by the above, the secondary batteries using a non-aqueous solvent as shown in FIG. 1 were prepared. In FIG. 1, reference numeral 1 represents a negative electrode and it is prepared by press forming 50 mg of each powder of the carbonaceous material as mentioned above to form a pellet having a diameter of 20 mm. 2 is a collector for the negative electrode comprising nickel. A negative electrode terminal 4 is electrically connected to the collector 2 for the negative electrode through a spring 3. 5 is a positive electrode which is prepared by press forming 50 mg of each powder of the carbonaceous material as mentioned above to form a pellet having a diameter of 20 mm, is prepared by mixing and kneading 450 mg of titanium disulfide ($TiS_2$) with 25 mg of polytetrafluoroethylene and 25 mg of acetylene black and then press forming it to a pellet having a diameter of 20 mm or is prepared by mixing and kneading 450 mg of vanadium pentoxide ($V_2O_5$) with 25 mg of polytetrafluoroethylene and 25 mg of acetylene black and then press forming it to a pellet having a diameter of 20 mm. The positive electrode 5 is one which is carried out a preliminary discharging at 2 mA for 10 hours in a propperformances.

(a) Evaluating test of charge/discharge cycle characteristics (i) As to the above respective batteries A to S, charge/discharge test was carried out under argon gas atmosphere at 25° C. upto each 100 cycles. A charging current and a discharging current were all 500 μA and discharge was started immediately after completion of charging. Closed circuit terminal voltages for charging and discharging processes were set at follows, respectively.

Figure 2:
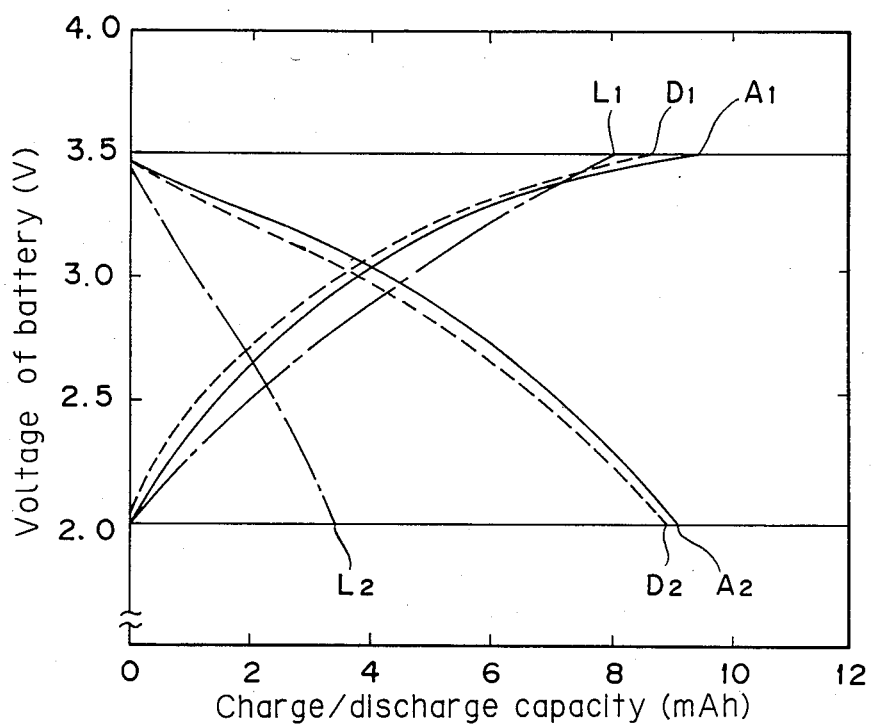
FIGS. 2 to 4 are drawings showing charge/discharge curve of the batteries.
Figure 3:
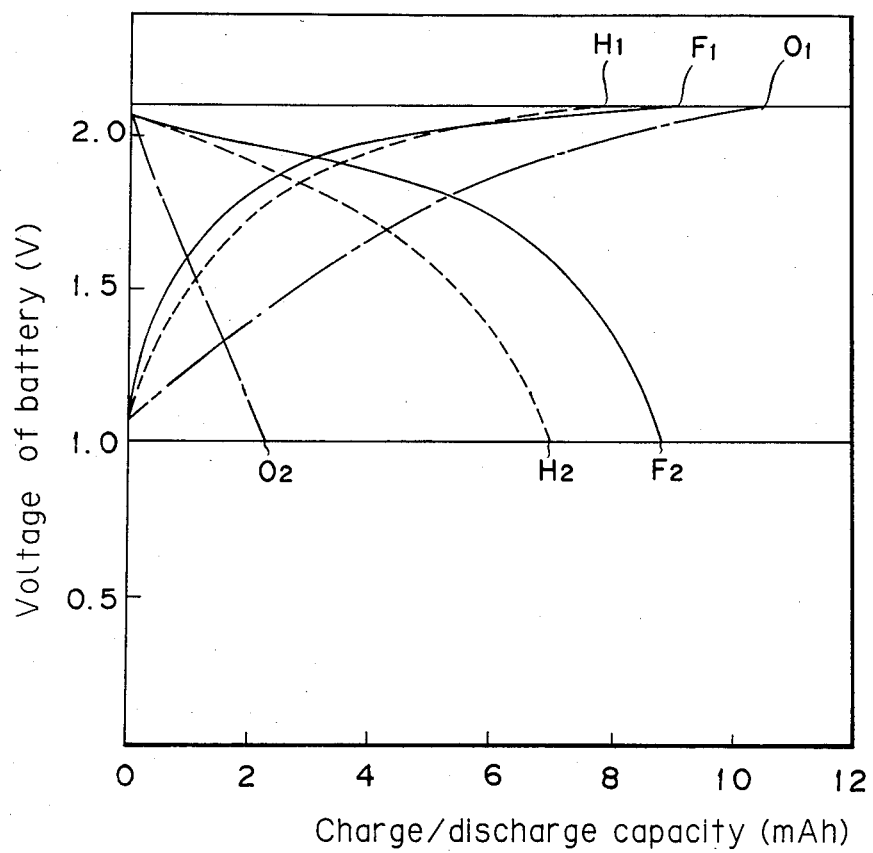
Figure 4:
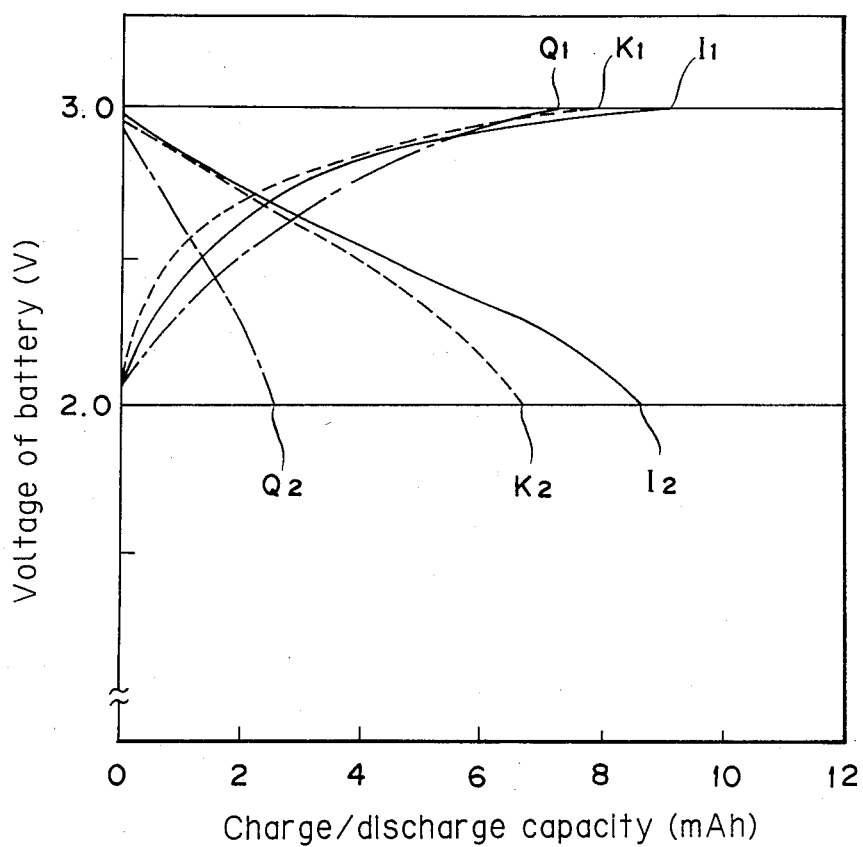

Batteries A to E, L and M:
  charging voltage=3.5 V,
  discharging terminal voltage=2.0 V
Batteries F to H and N to P:
  charging voltage=2.1 V,
  discharging terminal voltage=1.0 V
Batteries I to K and Q to S:
  charging voltage=3.0 V,
  discharging terminal voltage=2.0 V FIG. 2 shows charge/discharge curves of the batteries A, D and L at the fifth cycle. In the Fig., the curves $A_1$, $D_1$ and $L_1$ each represent charging curves of the batteries A, D and L, respectively, and curves $A_2$, $D_2$ and $L_2$ are each represent discharging curves of the same. Further, in FIG. 3, charge/discharge curves of the batteries F, H and O at the fifth cycle are shown, and curves $F_1$, $H_1$ and $O_1$ each represent charging curves of the batteries F, H and O, respectively, and curves $F_2$, $H_2$ and $O_2$ are each represent discharging curves of the same. Moreover, in FIG. 4, charge/discharge curves of the batteries I, K and Q at the fifth cycle are shown, and curves $I_1$, $K_1$ and $Q_1$ each represent charging curves of the batteries I, K and Q, respectively, and curves $I_2$, $K_2$ and $Q_2$ are each represent discharging curves of the same.

Furthermore, in Table 2, charging capacities, discharging capacities and charge/discharge efficiencies at the fifth cycle and the 100th cycle and a ratio (%) of discharging capacity at the 100th cycle to the fifth cycle of each of the batteries are shown.

TABLE 2

|  | Battery | Positive electrode material | Negative electrode material | Fifth cycle | | | 100th cycle | | | 100 cycle / 5 cycle |
|---|---|---|---|---|---|---|---|---|---|---|
|  |  |  |  | Charged capacity (mAh) | Discharged capacity (mAh) | Charge/discharge efficiency (%) | Charged capacity (mAh) | Discharged capacity (mAh) | Charge/discharge efficiency (%) | Ratio of discharge capacity (%) |
| Example 1 | A | Carbonaceous material d | Carbonaceous material a | 9.32 | 9.0 | 97 | 9.14 | 8.77 | 96 | 97 |
| Example 2 | B | Carbonaceous material d | Carbonaceous material b | 8.94 | 8.5 | 95 | 8.23 | 7.64 | 93 | 89 |
| Example 3 | C | Carbonaceous material c | Carbonaceous material a | 9.45 | 9.2 | 98 | 9.20 | 8.92 | 97 | 96 |
| Example 4 | D | Carbonaceous material e | Carbonaceous material b | 9.16 | 8.8 | 97 | 8.94 | 8.56 | 96 | 97 |
| Example 5 | E | Carbonaceous material c | Carbonaceous material c | 9.03 | 6.7 | 75 | 8.31 | 5.81 | 70 | 86 |
| Example 6 | F | $TiS_2$ | Carbonaceous material a | 9.04 | 8.68 | 96 | 8.67 | 7.37 | 85 | 84 |
| Example 7 | G | $TiS_2$ | Carbonaceous material b | 8.30 | 7.73 | 93 | 8.01 | 6.57 | 82 | 85 |
| Example 8 | H | $TiS_2$ | Carbonaceous material c | 7.85 | 6.65 | 85 | 7.54 | 5.60 | 74 | 84 |
| Example 9 | I | $V_2O_5$ | Carbonaceous material a | 8.76 | 8.41 | 96 | 8.40 | 7.14 | 85 | 84 |
| Example 10 | J | $V_2O_5$ | Carbonaceous material b | 8.00 | 7.40 | 92 | 7.27 | 6.21 | 85 | 83 |
| Example 11 | K | $V_2O_5$ | Carbonaceous material c | 7.50 | 6.54 | 87 | 7.20 | 6.00 | 86 | 91 |
| Comparative example 1 | L | Carbonaceous material d | Carbonaceous material d | 8.14 | 3.4 | 42 | 7.50 | 2.32 | 68 | 97 |
| Comparative example 2 | M | Carbonaceous material d | Graphite | 10.22 | 1.3 | 13 | 10.63 | 0.18 | 2 | 14 |
| Comparative example 3 | N | $TiS_2$ | Carbonaceous material d | 7.65 | 2.38 | 31 | 7.09 | 2.11 | 29 | 88 |
| Comparative example 4 | O | $TiS_2$ | Carbonaceous material e | 10.74 | 0.94 | 9 | 9.59 | 0.70 | 7 | 74 |
| Comparative example 5 | P | $TiS_2$ | Graphite | 12.63 | 1.89 | 14 | 12.01 | 0.26 | 2 | 13 |
| Comparative example 6 | Q | $V_2O_5$ | Carbonaceous material d | 7.26 | 2.52 | 34 | 6.22 | 1.38 | 22 | 54 |
| Comparative example 7 | R | $V_2O_5$ | Carbonaceous material e | 10.02 | 0.94 | 9 | 8.42 | 0.61 | 7 | 64 |
| Comparative example 8 | S | $V_2O_5$ | Graphite | 11.85 | 1.77 | 14 | 11.16 | 0.12 | 6 | 6 |

(ii) Charge/discharge test was carried out in the same manner as in the above (i) except for changing the charge/discharge cycle number to 50 cycles. In Table 3, charging capacities, discharging capacities and charge/discharge efficiencies at the tenth cycle and the 50th cycle and a ratio (%) of discharging capacity at the 50th cycle to the tenth cycle of each of the batteries are shown.

TABLE 3

| | Battery | Positive electrode material | Negative electrode material | Tenth cycle | | | 50th cycle | | | 50 cycle 10 cycle |
| --- | --- | --- | --- | --- | --- | --- | --- | --- | --- | --- |
| | | | | Charged capacity (mAh) | Discharged capacity (mAh) | Charge/ discharge efficiency (%) | Charged capacity (mAh) | Discharged capacity (mAh) | Charge/ discharge efficiency (%) | Ratio of discharge capacity (%) |
| Example 1 | A | Carbonaceous material d | Carbonaceous material a | 9.62 | 9.21 | 95 | 9.23 | 8.82 | 95 | 95 |
| Example 2 | B | Carbonaceous material d | Carbonaceous material b | 8.80 | 8.03 | 91 | 8.48 | 7.89 | 93 | 98 |
| Example 3 | C | Carbonaceous material c | Carbonaceous material a | 9.31 | 8.74 | 93 | 8.94 | 8.26 | 92 | 94 |
| Example 4 | D | Carbonaceous material e | Carbonaceous material b | 9.04 | 8.48 | 93 | 8.23 | 7.98 | 96 | 94 |
| Example 5 | E | Carbonaceous material c | Carbonaceous material c | 8.39 | 6.72 | 80 | 8.09 | 5.95 | 73 | 94 |
| Example 6 | F | $TiS_2$ | Carbonaceous material a | 9.05 | 8.78 | 97 | 8.50 | 8.08 | 95 | 92 |
| Example 7 | G | $TiS_2$ | Carbonaceous material b | 8.31 | 7.91 | 95 | 7.60 | 7.04 | 93 | 89 |
| Example 8 | H | $TiS_2$ | Carbonaceous material c | 7.88 | 7.01 | 89 | 6.60 | 5.61 | 85 | 80 |
| Example 9 | I | $V_2O_5$ | Carbonaceous material a | 8.58 | 8.20 | 95 | 8.22 | 7.13 | 86 | 86 |
| Example 10 | J | $V_2O_5$ | Carbonaceous material b | 7.98 | 7.46 | 93 | 7.18 | 6.56 | 91 | 87 |
| Example 11 | K | $V_2O_5$ | Carbonaceous material c | 7.43 | 6.78 | 91 | 6.91 | 5.68 | 82 | 83 |
| Comparative example 1 | L | Carbonaceous material d | Carbonaceous material d | 8.24 | 3.17 | 38 | 7.95 | 2.51 | 31 | 79 |
| Comparative example 2 | M | Carbonaceous material d | Graphite | 9.96 | 1.36 | 13 | 9.34 | 0.11 | 11 | 14 |
| Comparative example 3 | N | $TiS_2$ | Carbonaceous material d | 7.74 | 4.02 | 52 | 6.15 | 2.09 | 34 | 52 |
| Comparative example 4 | O | $TiS_2$ | Carbonaceous material e | 10.63 | 2.25 | 24 | 11.57 | 0.54 | 5 | 24 |
| Comparative example 5 | P | $TiS_2$ | Graphite | 12.53 | 1.88 | 15 | 13.71 | 0.26 | 2 | 14 |
| Comparative example 6 | Q | $V_2O_5$ | Carbonaceous material d | 7.45 | 2.33 | 31 | 6.93 | 1.91 | 27 | 81 |
| Comparative example 7 | R | $V_2O_5$ | Carbonaceous material e | 11.34 | 0.90 | 7 | 9.24 | 0.86 | 9 | 95 |
| Comparative example 8 | S | $V_2O_5$ | Graphite | 11.15 | 1.15 | 10 | 10.04 | 0.44 | 4 | 38 |

(b) Evaluating tests of self-discharge and preservability (i) In the same manner as in the above (a), usual charge/discharge was carried out upto the ninth cycle and then self-discharge test was carried out at the tenth cycle. That is, at the tenth cycle, discharge after completion of charging was carried out after preservation at 25° C. for 30 days.

In Table 4, charging capacities, discharging capacities and charge/discharge efficiencies at which discharging was immediately carried out at the ninth cycle and at which discharging was carried out at the tenth cycle after preservation for 30 days and a ratio (%) of discharging capacity at the tenth cycle to the ninth cycle of each of the batteries are shown.

TABLE 4

| | Battery | Positive electrode material | Negative electrode material | Ninth cycle Charged capacity (mAh) | Ninth cycle Discharged capacity (mAh) | Ninth cycle Charge/discharge efficiency (%) | Tenth cycle Charged capacity (mAh) | Tenth cycle Discharged capacity (mAh) | Tenth cycle Charge/discharge efficiency (%) | 10 cycle / 9 cycle Ratio of discharge capacity (%) |
|---|---|---|---|---|---|---|---|---|---|---|
| Example 1 | A | Carbonaceous material d | Carbonaceous material a | 9.32 | 9.02 | 97 | 9.31 | 8.81 | 95 | 97 |
| Example 2 | B | Carbonaceous material d | Carbonaceous material b | 8.92 | 8.48 | 95 | 8.91 | 8.12 | 91 | 96 |
| Example 3 | C | Carbonaceous material c | Carbonaceous material a | 9.45 | 9.25 | 98 | 9.47 | 8.02 | 85 | 87 |
| Example 4 | D | Carbonaceous material e | Carbonaceous material b | 9.15 | 8.83 | 97 | 9.13 | 7.06 | 77 | 80 |
| Example 5 | E | Carbonaceous material c | Carbonaceous material c | 9.01 | 6.76 | 75 | 8.87 | 4.59 | 52 | 71 |
| Example 6 | F | $TiS_2$ | Carbonaceous material a | 9.06 | 8.78 | 96 | 8.87 | 8.60 | 97 | 97 |
| Example 7 | G | $TiS_2$ | Carbonaceous material b | 8.30 | 7.92 | 95 | 8.29 | 7.67 | 96 | 96 |
| Example 8 | H | $TiS_2$ | Carbonaceous material c | 7.86 | 7.00 | 89 | 7.86 | 6.82 | 97 | 97 |
| Example 9 | I | $V_2O_5$ | Carbonaceous material a | 8.57 | 8.19 | 95 | 8.39 | 7.23 | 88 | 88 |
| Example 10 | J | $V_2O_5$ | Carbonaceous material b | 8.00 | 7.48 | 93 | 8.00 | 6.91 | 92 | 92 |
| Example 11 | K | $V_2O_5$ | Carbonaceous material c | 7.41 | 6.76 | 91 | 7.29 | 6.19 | 91 | 91 |
| Comparative example 1 | L | Carbonaceous material d | Carbonaceous material d | 8.10 | 3.38 | 42 | 7.22 | 0.60 | 8 | 18 |
| Comparative example 2 | M | Carbonaceous material d | Graphite | 10.17 | 1.30 | 13 | 12.43 | 0.03 | ≈0 | 3 |
| Comparative example 3 | N | $TiS_2$ | Carbonaceous material d | 7.34 | 3.81 | 51 | 7.18 | 3.42 | 47 | 89 |
| Comparative example 4 | O | $TiS_2$ | Carbonaceous material e | 9.76 | 2.05 | 21 | 9.22 | 1.90 | 20 | 92 |
| Comparative example 5 | P | $TiS_2$ | Graphite | 12.32 | 1.84 | 14 | 11.98 | 1.28 | 10 | 69 |
| Comparative example 6 | Q | $V_2O_5$ | Carbonaceous material d | 7.31 | 2.28 | 31 | 6.46 | 2.05 | 31 | 89 |
| Comparative example 7 | R | $V_2O_5$ | Carbonaceous material e | 9.52 | 0.75 | 7 | 9.41 | 0.37 | 3 | 49 |
| Comparative example 8 | S | $V_2O_5$ | Graphite | 12.16 | 1.21 | 9 | 12.12 | 0.99 | 8 | 81 |

(ii) In the same manner as in the above (i), usual charge/discharge was carried out upto the forth cycle and then self-discharge test was carried out at the fifth cycle. That is, at the tenth cycle, discharge after completion of charging was carried out after preservation at 25° C. for 30 days.

In Table 5, charging capacities, discharging capacities and charge/discharge efficiencies at which discharging was immediately carried out at the forth cycle and at which discharging was carried out at the fifth cycle after preservation for 30 days and a ratio (%) of discharging capacity at the fifth cycle to the fourth cycle of each of the batteries are shown.

TABLE 5

| | Battery | Positive electrode material | Negative electrode material | Forth cycle Charged capacity (mAh) | Forth cycle Discharged capacity (mAh) | Forth cycle Charge/discharge efficiency (%) | Fifth cycle Charged capacity (mAh) | Fifth cycle Discharged capacity (mAh) | Fifth cycle Charge/discharge efficiency (%) | 5 cycle/4 cycle Ratio of discharge capacity (%) |
|---|---|---|---|---|---|---|---|---|---|---|
| Example 1 | A | Carbonaceous material d | Carbonaceous material a | 9.30 | 9.00 | 96 | 8.96 | 8.86 | 98 | 98 |
| Example 2 | B | Carbonaceous material d | Carbonaceous material b | 8.99 | 8.41 | 93 | 8.94 | 8.19 | 91 | 97 |
| Example 3 | C | Carbonaceous material c | Carbonaceous material a | 9.54 | 9.21 | 96 | 9.06 | 8.92 | 98 | 96 |
| Example 4 | D | Carbonaceous material e | Carbonaceous material b | 9.63 | 9.10 | 94 | 9.02 | 8.78 | 97 | 96 |
| Example 5 | E | Carbonaceous material c | Carbonaceous material c | 9.30 | 6.92 | 74 | 8.52 | 6.14 | 88 | 88 |
| Example 6 | F | $TiS_2$ | Carbonaceous material a | 9.04 | 8.77 | 97 | 9.04 | 8.68 | 96 | 99 |
| Example 7 | G | $TiS_2$ | Carbonaceous material b | 8.30 | 7.89 | 95 | 8.30 | 7.78 | 93 | 98 |
| Example 8 | H | $TiS_2$ | Carbonaceous material c | 7.86 | 7.00 | 89 | 7.85 | 6.65 | 85 | 95 |
| Example 9 | I | $V_2O_5$ | Carbonaceous material a | 8.49 | 8.32 | 97 | 8.46 | 8.21 | 97 | 98 |
| Example 10 | J | $V_2O_5$ | Carbonaceous material b | 8.12 | 7.87 | 96 | 8.03 | 7.15 | 89 | 90 |
| Example 11 | K | $V_2O_5$ | Carbonaceous material c | 7.71 | 6.46 | 83 | 7.63 | 6.16 | 80 | 95 |
| Comparative example 1 | L | Carbonaceous material d | Carbonaceous material d | 8.13 | 3.30 | 40 | 8.05 | 2.97 | 36 | 90 |
| Comparative example 2 | M | Carbonaceous material d | Graphite | 10.12 | 1.28 | 12 | 10.06 | 1.15 | 11 | 89 |
| Comparative example 3 | N | $TiS_2$ | Carbonaceous material d | 7.69 | 3.76 | 49 | 7.65 | 2.36 | 31 | 63 |
| Comparative example 4 | O | $TiS_2$ | Carbonaceous material e | 10.72 | 2.24 | 22 | 10.74 | 0.94 | 9 | 42 |
| Comparative example 5 | P | $TiS_2$ | Graphite | 12.62 | 1.89 | 15 | 12.63 | 0.02 | ≈0 | ≈0 |
| Comparative example 6 | Q | $V_2O_5$ | Carbonaceous material d | 7.35 | 3.50 | 47 | 7.31 | 2.21 | 30 | 63 |
| Comparative example 7 | R | $V_2O_5$ | Carbonaceous material e | 10.18 | 2.11 | 20 | 10.05 | 0.87 | 8 | 41 |
| Comparative example 8 | S | $V_2O_5$ | Graphite | 12.00 | 1.73 | 14 | 11.56 | 0.01 | ≈0 | ≈0 |

As clearly seen from the description as mentioned above, the secondary battery using a non-aqueous solvent of the present invention using a carbonaceous material having the specific structure for the negative electrode has extremely excellent charge/discharge cycle charcteristics as compared with those used a conventional graphite as the negative electrode material and those used a carbonaceous material deviated from the requirements of the present invention, and is less in self-discharge and excellent in preservability whereby its industrial value is extremely great.

We claim:

1. A secondary battery using a non-aqueous solvent which comprises in a non-aqueous solvent secondary battery comprising a positive electrode capable of recharging, an electrolytic solution dissolving an electrolyte in a non-aqueous solvent and a negative electrode capable of recharging, the improvement wherein said negative electrode comprises a carbonaceous material obtained by the carbonization of at least one of a compound selected from the group consisting of an organic high molecular compound, a condensed polycyclic hydrocarbon compound and polycyclic heterocyclic compound, and having a pseudographite structure of an atomic ratio of hydrogen/carbon being not more than 0.15, a spacing of (002) planes as determined by X-ray wide-angle diffraction being 3.37 Å to 3.75 Å and a crystallite size in the direction of c axis being 8 Å to 150 Å.

2. A secondary battery using a non-aqueous solvent according to claim 1, wherein the battery has the structure of laminating said positive electrode and said negative electrode through a separator impregnated an electrolyte.

3. A secondary battery using a non-aqueous solvent according to claim 1, wherein said electrolyte is a combination of an alkali metal cation and at least one an anion selected from the group consisting of $ClO_4^-$, $PF_6^-$, $BF_4^-$, $CF_3SO_3^-$ and $AsF_6^-$; or a quaternary ammonium salt.

4. A secondary battery using a non-aqueous solvent according to claim 1, wherein said negative electrode comprises a carbonaceous material having the atomic ratio of hydrogen/carbon being not more than 0.10, the spacing of (002) planes, $d_{002}$, as determined by X-ray wide-angle diffraction being 3.39 Å to 3.75 Å and the crystallite size in the direction of c axis, Lc, being 8 Å to 100 Å.

5. A secondary battery using a non-aqueous solvent according to claim 4, wherein said negative electrode comprises a carbonaceous material having the atomic ratio of hydrogen/carbon being not more than 0.07, the $d_{002}$ being 3.41 Å to 3.70 Å and the Lc being 10 Å to 70 Å.

6. A secondary battery using a non-aqueous solvent according to claim 1, wherein said negative electrode comprises a carbonaceous material having the atomic ratio of hydrogen/carbon being not more than 0.10, the spacing of (002) planes, $d_{002}$, as determined by X-ray wide-angle diffraction being 3.39 Å to 3.75 Å, the crystallite size in the direction of c axis, Lc, being 8 Å to 100 Å, a crystallite size in the direction of a axis, La, being 10 Å or more and a distance $a_0$ twice the spacing $d_{110}$ of the (110) planes measured by X-ray wide-angle diffraction being 2.38 Å to 2.47 Å.

7. A secondary battery using a non-aqueous solvent according to claim 6, wherein said negative electrode comprises a carbonaceous material having the atomic ratio of hydrogen/carbon being not more than 0.07, the $d_{002}$ being 3.41 Å to 3.70 Å, the Lc being 10 Å to 70 Å, the La being 15 Å to 150 Å and the $a_0$ being 2.39 Å to 2.46 Å.

8. A secondary battery using a non-aqueous solvent according to claim 1, wherein said positive electrode is constituted by a metallic chalcogen compound.

9. A secondary battery using a non-aqueous solvent according to claim 8, wherein said metallic chalcogen compound is selected from the group consisting of $Cr_3O_8$, $V_2O_5$, $V_6O_{13}$, $LiCoO_2$, $MoO_3$, $WO_3$, $TiS_2$, $V_2S_5$, $MoS_2$, $MoS_3$, $CuS$, $Fe_{0.25}V_{0.75}S_2$, $Cr_{0.25}V_{0.75}S_2$, $Cr_{0.5}V_{0.5}S_2$, $Na_{0.1}CrS_2$, $NiPS_3$, $FePS_3$, $VSe_2$ and $NbSe_3$.

10. A secondary battery using a non-aqueous solvent according to claim 1, wherein a discharging capacity of said positive electrode is set 1.1-fold or more to that of said negative electrode.

11. A second battery using a non-aqueous solvent according to claim 1, wherein said positive electrode is constituted by a carbonaceous material obtained by carbonizing at least one compound selected from the group consisting of an organic high molecular compound, a condensed polycyclic hydrocarbon compound and polycyclic heterocyclic compound and having an atomic ratio of hydrogen/carbon being 0.10 or more to 0.70 or less.

12. A secondary battery using a non-aqueous solvent according to claim 11, wherein said positive electrode comprises a carbonaceous material having the atomic ratio of hydrogen/carbon being 0.10 to 0.60, a spacing of (002) planes, $d_{002}$, as determined X-ray wide-angle diffraction being 3.42 Å or more and a crystallite size in the direction of c axis, Lc, being 70 Å or less.

13. A secondary battery using a non-aqueous solvent according to claim 12, wherein said positive electrode comprises a carbonaceous material having the atomic ratio of hydrogen/carbon being 0.10 to 0.50, the $d_{002}$ being 3.44 Å or more and the Lc being 50 Å or less.

14. A secondary battery using a non-aqueous solvent according to claim 13, wherein said positive electrode comprises a carbonaceous material having the atomic ratio of hydrogen/carbon being 0.10 to 0.50, the $d_{002}$ being 3.46 Å or more and the Lc being 30 Å or less.

15. A secondary battery using a non-aqueous solvent according to claim 1, wherein said carbonaceous material is previously doped an alkali metal cation.

16. A secondary battery using a non-aqueous solvent according to claim 8, wherein said chalcogen compound is previously doped an alkali metal cation.

17. A secondary battery using a non-aqueous solvent according to claim 1, wherein said carbonization is carried out at 1400° C. or higher.

18. A secondary battery using a non-aqueous solvent according to claim 1, wherein said carbonization is carried out at 1600° C. or higher.

19. A secondary battery using a non-aqueous solvent according to claim 1 wherein the x-ray wide-angle diffraction is 3.41 Å to 3.70 Å and the crystallite size in the direction of c axis is 10 Å to 70 Å.

20. A secondary battery using a non-aqueous solvent according to claim 3 wherein the x-ray wide-angle diffraction is 3.41 Å to 3.70 Å and the crystallite size in the direction of c axis is 10 Å to 70 Å.

* * * * *